United States Patent
Chen et al.

(10) Patent No.: US 9,250,477 B2
(45) Date of Patent: Feb. 2, 2016

(54) ARRAY SUBSTRATE AND LIQUID CRYSTAL DISPLAY

(75) Inventors: Dong Chen, Beijing (CN); Xue Dong, Beijing (CN); Cheng Li, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 186 days.

(21) Appl. No.: 13/524,144

(22) Filed: Jun. 15, 2012

(65) Prior Publication Data
US 2012/0320320 A1    Dec. 20, 2012

(30) Foreign Application Priority Data
Jun. 17, 2011    (CN) .............................. 201110164236

(51) Int. Cl.
*G02F 1/1337*    (2006.01)
*G02F 1/1343*    (2006.01)

(52) U.S. Cl.
CPC .... *G02F 1/133707* (2013.01); *G02F 1/134309* (2013.01); *G02F 2001/134381* (2013.01)

(58) Field of Classification Search
CPC ............................................... G02F 1/133753
USPC ....................................................... 349/123
See application file for complete search history.

(56) References Cited

U.S. PATENT DOCUMENTS

| | | | |
|---|---|---|---|
| 5,434,690 A * | 7/1995 | Hisatake et al. | 349/8 |
| 6,642,984 B1 * | 11/2003 | Yoshida et al. | 349/139 |
| 2004/0056987 A1 * | 3/2004 | Song | 349/43 |
| 2004/0263748 A1 * | 12/2004 | Park et al. | G02F 1/134363 349/141 |
| 2005/0146662 A1 * | 7/2005 | Inoue et al. | 349/129 |
| 2007/0030428 A1 * | 2/2007 | Lu et al. | 349/126 |
| 2008/0100787 A1 * | 5/2008 | Segawa et al. | 349/141 |
| 2009/0268134 A1 * | 10/2009 | Lee et al. | 349/110 |
| 2009/0279027 A1 * | 11/2009 | Nishida | 349/114 |
| 2009/0284705 A1 * | 11/2009 | Ogura et al. | 349/144 |
| 2010/0085500 A1 * | 4/2010 | Kim | 349/42 |
| 2011/0001917 A1 * | 1/2011 | Araya et al. | 349/183 |
| 2011/0176100 A1 * | 7/2011 | Nishida et al. | G02F 1/134363 349/143 |
| 2011/0261295 A1 * | 10/2011 | Kim | G02F 1/133707 349/96 |

* cited by examiner

*Primary Examiner* — Sang V Nguyen
(74) *Attorney, Agent, or Firm* — Ladas & Parry LLP

(57) ABSTRACT

An embodiment of the present disclosure provides an array substrate, and the array substrate including: at least a data line and at least a gate line; and a plurality of pixel units defined by the data line and the gate line. Each of the plurality of pixel units includes a thin film transistor, a first electrode and a second electrode, and the first electrode and the second electrode overlap each other and are insulated from each other and the second electrode is positioned above the first electrode. An alignment film is formed on a surface of the array substrate, a direction of the second electrode and one side of the array substrate form a predetermined angle and a rubbing direction of the alignment film is parallel to the one side of the array substrate.

14 Claims, 6 Drawing Sheets

ARRAY SUBSTRATE AND LIQUID CRYSTAL DISPLAY

BACKGROUND

One or more embodiments of the present disclosure relate to an array substrate and a liquid crystal display (LCD).

In an advanced-super dimensional switching (AD-SDS) LCD, a parallel electric field generated through the fringes of pixel electrodes or common electrodes positioned in the same plane and a vertical electric field generated between the pixel electrode and the common electrode on different levers can constitute a multi-dimensional electric field, and thus, liquid crystal molecules that are orientated between the pixel electrodes or the common electrodes and directly above the pixel electrodes or the common electrodes inside a liquid crystal cell can be rotated, thereby the work efficiency of liquid crystal display of a plane orientation mode can be improved and a light-transmitting efficiency can be increased. The AD-SDS technology can improve the displaying quality of a TFT-LCD, and has advantages of high transmittance, wide viewing angle, high aperture ratio, low chromatic aberration, short response time, no push Mura, etc.

Advanced-Super Dimensional Switching-Liquid Crystal Displays (AD-SDS-LCDs) can be classified into dual-domain AD-SDS-LCDs and single-domain AD-SDS-LCDs based on the direction of pixel electrodes on an array substrate. Compared with a dual-domain AD-SDS-LCD, a single-domain AD-SDS-LCD has a relatively high transmittance and is broadly applied to a small-size product.

An existing array substrate of the single-domain AD-SDS-LCD on which a pattern is formed is shown in FIG. 1. As shown in FIG. 1, one side of the array substrate is used as a reference line, the data lines are parallel to the reference line, the gate lines are perpendicular to the reference line and the direction of the pixel electrodes are parallel to the data lines. With respect to the single-domain AD-SDS-LCD, rubbing directions (i.e., a original orientation of a liquid crystal) of the alignment films respectively formed on the array substrate and the color filter substrate of the LCD are required to form an angle of about 7 degree with the direction of the pixel electrodes in order to avoid the driving disorder, that is to say, the original orientation of the liquid crystal forms an angle of about 7 degree with the reference line. However, with reference to a viewing angle effect view shown in FIG. 2, it can be seen that the angle formed between the original orientation of the liquid crystal and the reference line may cause a preferable viewing angle region (a cross region in FIG. 2) to shift about 7 degree about the reference line, and thus, a displaying discomfort occurs.

SUMMARY

An embodiment of the present disclosure provides an array substrate, and the array substrate comprising: at least a data line and at least a gate line; and a plurality of pixel units defined by the data line and the gate line. Each of the plurality of pixel units comprises a thin film transistor, a first electrode and a second electrode, and the first electrode and the second electrode overlap each other and are insulated from each other and the second electrode is positioned above the first electrode. An alignment film is formed on a surface of the array substrate, a direction of the second electrode and one side of the array substrate form a predetermined angle and a rubbing direction of the alignment film is parallel to the one side of the array substrate.

An embodiment of the present disclosure further provides a liquid crystal display, and the liquid crystal display comprising: an array substrate and a color filter substrate. The array substrate and the color filter substrate are positioned opposite to each other to form a liquid crystal cell, and alignment films are respectively formed on inner surfaces of the array substrate and the color filter substrate. The array substrate comprises: at least a data line and at least a gate line; and a plurality of pixel units defined by the data line and the gate line. Each of the plurality of pixel units comprises a thin film transistor, a first electrode and a second electrode, and the first electrode and the second electrode overlap each other and are insulated from each other and the second electrode is positioned above the first electrode. The alignment film is formed on a surface of the array substrate, a direction of the second electrode and one side of the array substrate form a predetermined angle and a rubbing direction of the alignment film is parallel to the one side of the array substrate.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

DETAILED DESCRIPTION

Embodiments of the present disclosure now will be described more fully hereinafter with reference to the accompanying drawings, in which the embodiments of the disclosure are shown, but only some embodiments of the present disclosure are described here. Other embodiments completed by those skilled in the relevant art based on the embodiments disclosed herein without any inventive work all fall within the protection scope of the present disclosure.

First Embodiment

Figure 3:
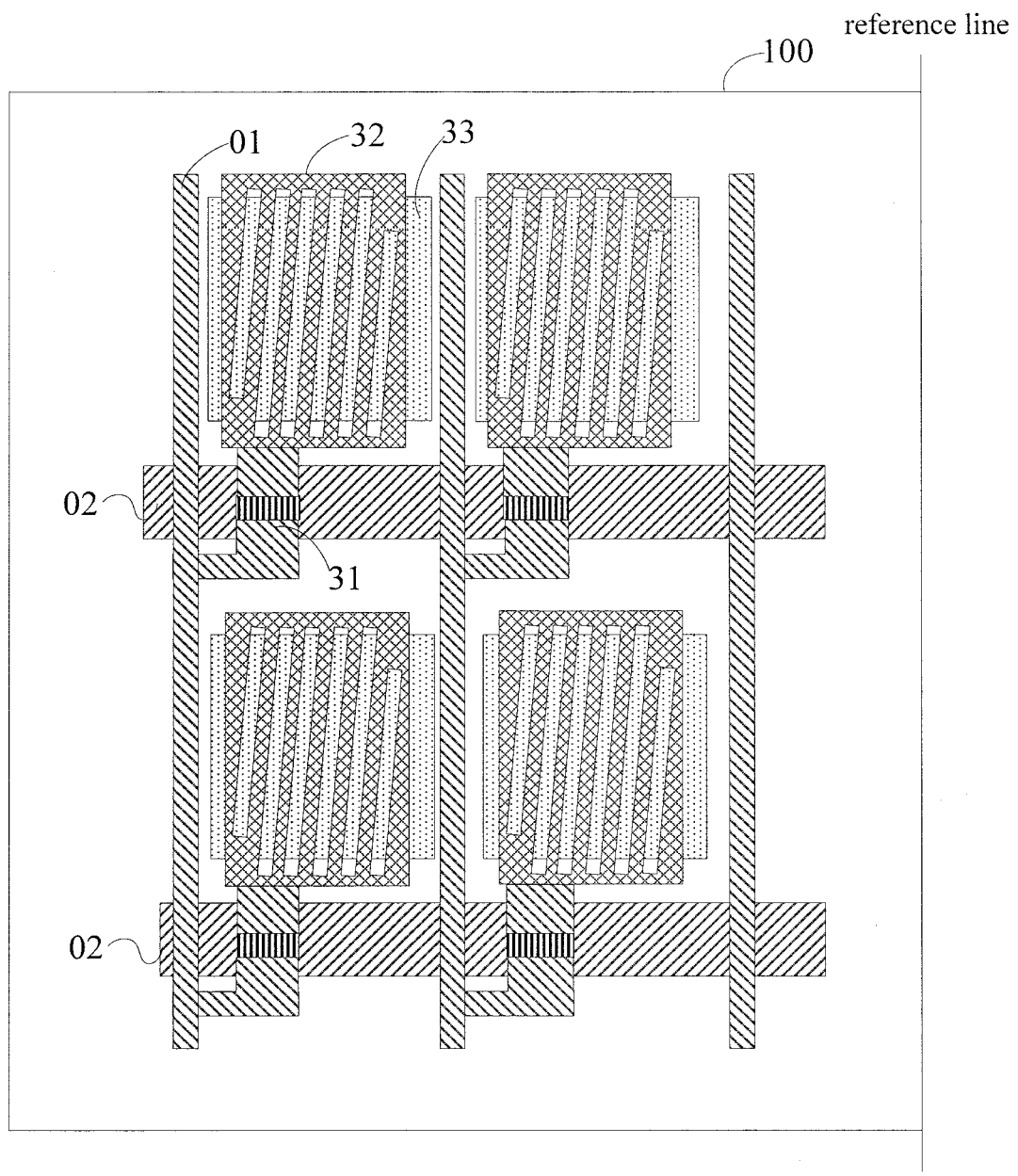
FIG. 3 is a top view of an array substrate according to an first embodiment of the present disclosure.

As shown in FIG. 3, a first embodiment of the present disclosure provides an array substrate 100, and an alignment film (not shown) is formed on an upper surface of the array substrate 100. The array substrate 100 comprises at least one data line 01, at least one gate line 02 and a plurality of pixel units defined by the data line 01 and the gate line 02, and each of the plurality of pixel units comprises a thin film transistor 31 as a switching element, a first electrode and a second electrode. The direction of the second electrode and one side of the array substrate 100 form a predetermined angle and the rubbing direction of the alignment film is parallel to the one side of the array substrate 100. The array substrate 100 typically has a rectangular profile.

As shown in FIG. 3, one side of the array substrate 100 is used as a reference line.

In an embodiment of the present disclosure, the first electrode may be a first transparent conductive layer formed in a pixel unit of the array substrate 100, for example, may be a first layer of indium tin oxide (ITO), and the second electrode may be a second transparent conductive layer formed in the pixel unit of the array substrate 100, for example, may be a second layer of ITO. The first electrode and the second electrode overlap each other in the pixel unit and are insulated from each other (for example, spaced from each other with an insulation layer). Here, the second electrode is positioned above the first electrode, that is, more closer to the upper surface of the substrate on which the alignment film is formed.

In an embodiment of the present disclosure, liquid crystals above the array substrate 100 are driven by the multi-dimensional electric field generated by the first electrode and the second electrode of each pixel on the array substrate 100, and thus are orientated, so the second electrode is usually formed into an electrode with a pattern and the pattern is generally a stripe pattern. And the direction of the second electrode refers to a long axis direction of the pattern of the second electrode, for example, if the second electrode is formed to have a stripe (or bar) pattern, the direction of the second electrode is a long axis direction of the stripe pattern. The rubbing direction of the alignment film can determine the original orientation of liquid crystals in a liquid crystal display with the array substrate 100 on which the alignment film is formed. Generally, the rubbing direction of the alignment film is consistent with the original orientation of the liquid crystals. In addition, after a color filter substrate and the array substrate 100 are bonded together to face each other to form a liquid crystal panel, the rubbing directions of the alignment films formed on the two substrates are identical with each other.

In addition, one of the first electrode and the second electrode, which is connected to the drain electrode (or source electrode) of the thin film transistor in the pixel unit is the pixel electrode, and correspondingly the other electrode is the common electrode.

More specifically, in the present embodiment, the second electrode is connected with the drain electrode of the thin film transistor 31, that is to say, the second electrode is the pixel electrode 32, and correspondingly the first electrode is the common electrode 33. Slits are formed in the pixel electrode 32 so that the pixel electrode 32 have a pattern of a plurality of stripes, and no slits are formed in the common electrode 33. In addition, in the present embodiment, the direction of the second electrode is a long axis direction of a stripe of the pixel electrode 32.

For example, the predetermined angle may be in a range of 5~20 degree. More preferably, the predetermined angle may be 7 degree. As shown in FIG. 3, one side of the array substrate 100 is used as the reference line, the predetermined angle is formed between the direction of the pixel electrode 32 and the reference line, and the predetermined angle is, for example, 7 degree.

Further, a stripe slit of the pixel electrode 32 is not limited to a rectangle shape, and for example, an end portion thereof may have an arc shape. In addition, the pixel electrode 32 may be formed in a comb shape and the common electrode 33 also is not limited to a plate-like structure and for example, may have a plurality of slits formed therein.

Figure 4:
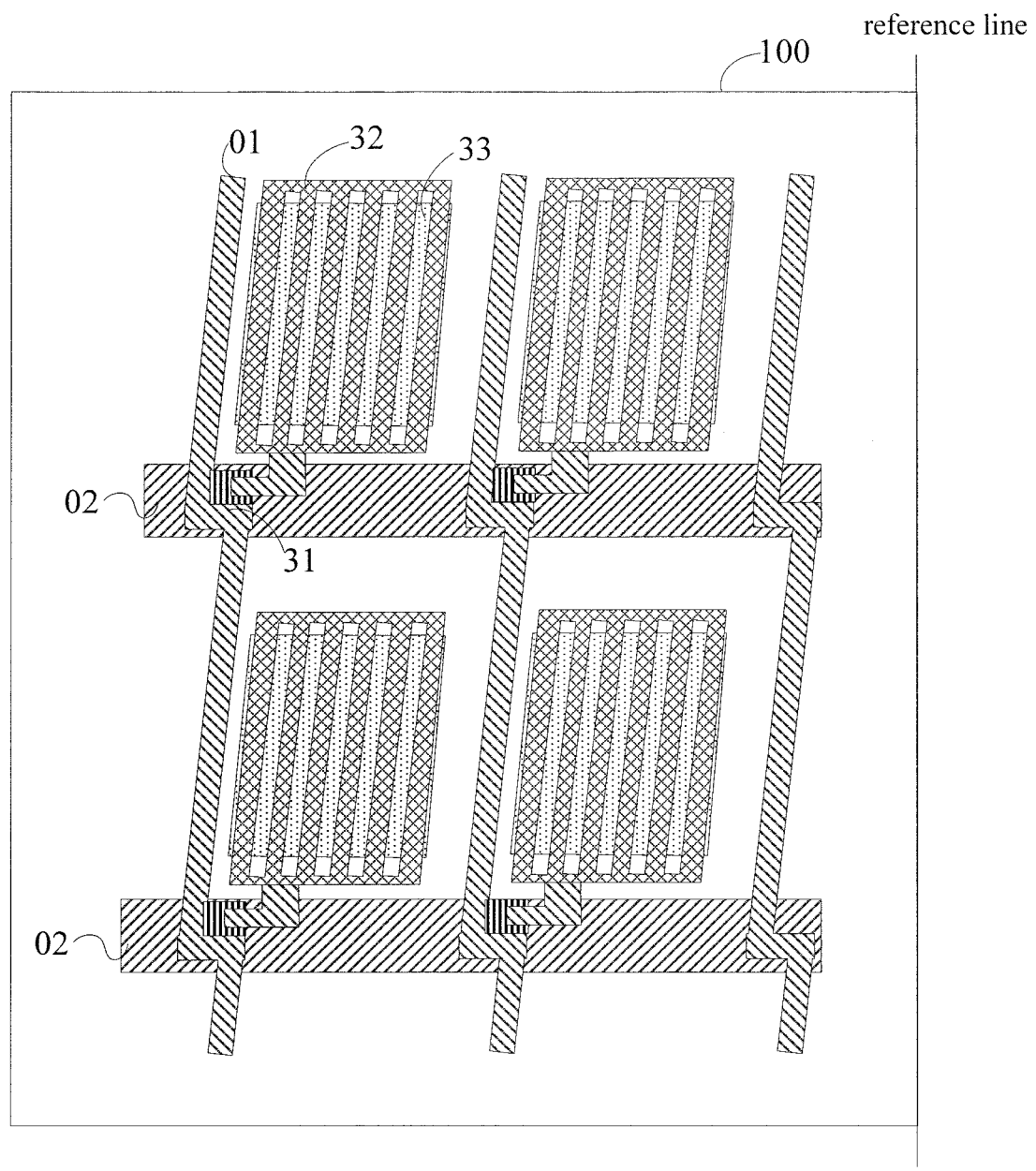
FIG. 4 is a top view of another array substrate according to first embodiment of the present disclosure.

In a variation of the present embodiment, one segment of the data line 01 corresponding to each of the plurality of pixel units is parallel to the direction of the second electrode in the pixel unit. In the present embodiment, as shown in FIG. 4, the segment of the data line corresponding to each of the plurality of pixel units is parallel to the direction of the pixel electrode 32 in the pixel unit, and thus, each data line is formed in a continuous zigzag ("Z") shape.

Figure 7:
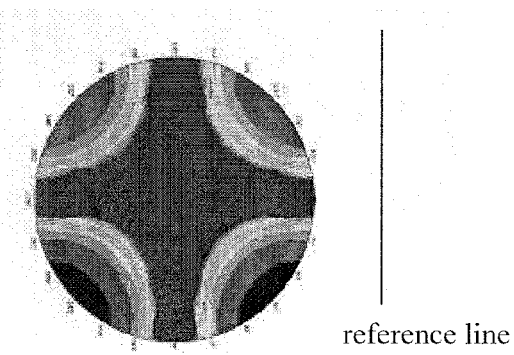
FIG. 7 is a view for showing a viewing angle effect of a LCD comprising the array substrate shown in FIG. 3, 4, 5 or 6.

In an embodiment of the present disclosure, the direction of the pixel electrode forms the predetermined angle with respect to the reference line and the rubbing direction of the alignment film is parallel to the reference line, that is, the rubbing direction of the alignment film forms the predetermined angle with respect to the direction of the pixel electrode, and thus, a normal displaying of a liquid crystal display can be realized. In addition, the rubbing direction of the alignment film is parallel to the reference line, that is, the original orientation of liquid crystals is parallel to the reference line, so that as shown in FIG. 7, the transverse axis and the longitudinal axis of the preferable viewing angle region (a cross region in FIG. 7) of the liquid crystal display comprising the array substrate are parallel or perpendicular to the reference line, that is, the preferable viewing angle region is not deflected or shifted, and thereby, an excellent displaying can be achieved.

Second Embodiment

Figure 5:
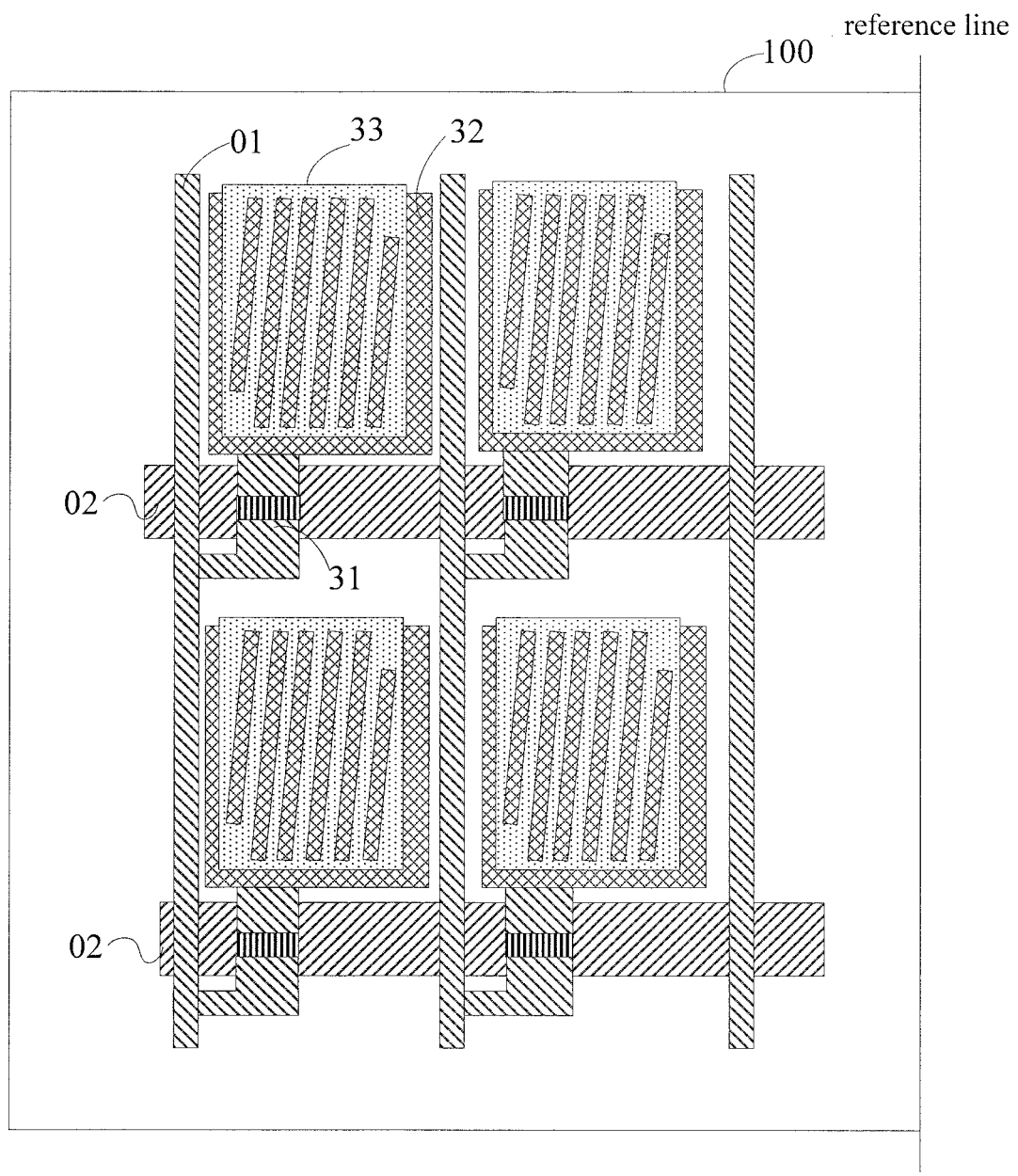
FIG. 5 is a top view of an array substrate according to an second embodiment of the present disclosure.

As shown in FIG. 5, a second embodiment of the present disclosure provides an array substrate 100, and an alignment film (not shown) is formed on an upper surface of the array substrate 100. The array substrate 100 comprises at least one data line 01, at least one gate line 02 and a plurality of pixel units defined by the data line 01 and the gate line 02, and each of the plurality of pixel units comprises a thin film transistor 31 as a switching element, a first electrode and a second electrode. The direction of the second electrode and one side of the array substrate 100 form a predetermined angle and the rubbing direction of the alignment film is parallel to the side of the array substrate 100. The first electrode and the second electrode overlap each other in the pixel unit and are insulated from each other, and the second electrode is positioned above the first electrode. The array substrate typically has a rectangular profile.

Further, in the present embodiment, the first electrode is connected to the drain electrode (or source electrode) of the thin film transistor 31, that is, the first electrode is the pixel electrode 32 and accordingly the second electrode is the common electrode 33. Slits are formed in the common electrode 33 so that the common electrode 33 have a pattern of a plurality of stripes (or bars) and no slits are formed in the pixel electrode 32. In addition, in the present embodiment, the direction of the second electrode is the long axis direction of the stripe of the common electrode 33.

For example, the predetermined angle may be in a range of 5~20 degree. More preferably, the predetermined angle is 7 degree. As shown in FIG. 5, one side of the array substrate 100 is used as the reference line, the predetermined angle is formed between the direction of the common electrode 33 and the reference line and the predetermined angle is, for example, 7 degree.

Further, a stripe slit of the above common electrode 33 is not limited to have a rectangle shape, and for example, an end portion thereof may have an arc shape. In addition, the common electrode 33 may be formed in a comb shape and the pixel electrode 32 also is not limited to a plate-like structure and for example, may have a plurality of slits formed therein.

Figure 6:
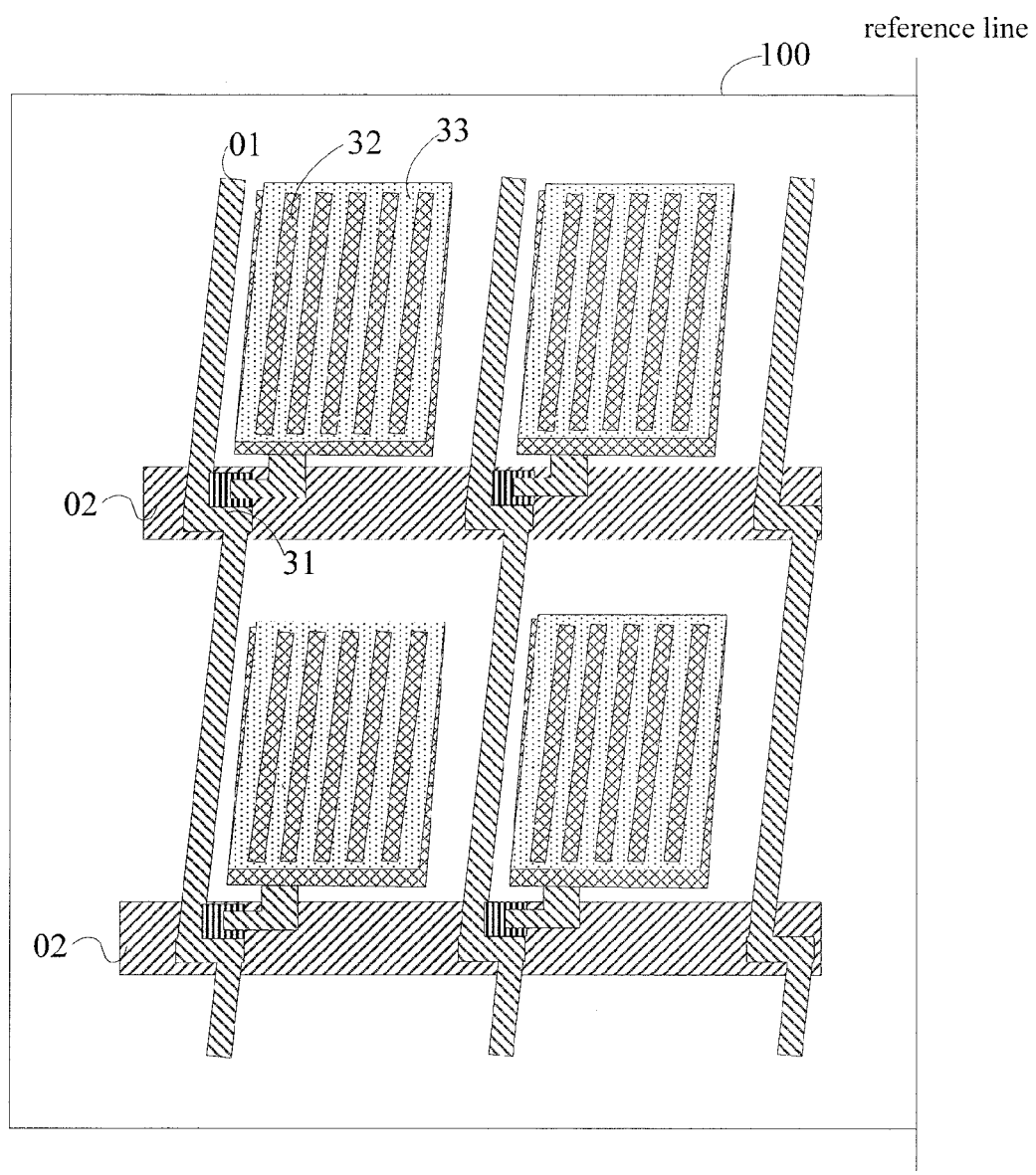
FIG. 6 is a top view of another array substrate according to the second embodiment of the present disclosure.

In a variation of the present embodiment, one segment of the data line 01 corresponding to each of the plurality of pixel units is parallel to the direction of the second electrode in the pixel unit. In the present embodiment, as shown in FIG. 6, one segment of the data line corresponding to each of the plurality of pixel units is parallel to the direction of the common electrode 33 in the pixel unit, and thus, each data line is formed in a continuous zigzag ("Z") shape.

In an embodiment of the present disclosure, the direction of the common electrode forms the predetermined angle with respect to the reference line and the rubbing direction of the alignment film is parallel to the reference line, that is, the rubbing direction of the alignment film forms the predetermined angle with respect to the direction of the common electrode, and thus, a normal displaying of a liquid crystal display can be realized. In addition, the rubbing direction of the alignment film is parallel to the reference line, that is, the original orientation of a liquid crystal is parallel to the reference line, so that as shown in FIG. 7, the transverse axis and the longitudinal axis of the preferable viewing angle region (the cross region in FIG. 7) of a liquid crystal display comprising the array substrate are parallel or perpendicular to the reference line, that is, the preferable viewing angle region is not deflected or shifted, and thereby, an excellent displaying can be achieved.

Third Embodiment

A third embodiment of the present disclosure provides a liquid crystal display comprising an array substrate disclosed by the above first embodiment or the above second embodiment, the liquid crystal display is in detail explained as follows.

Figure 8:
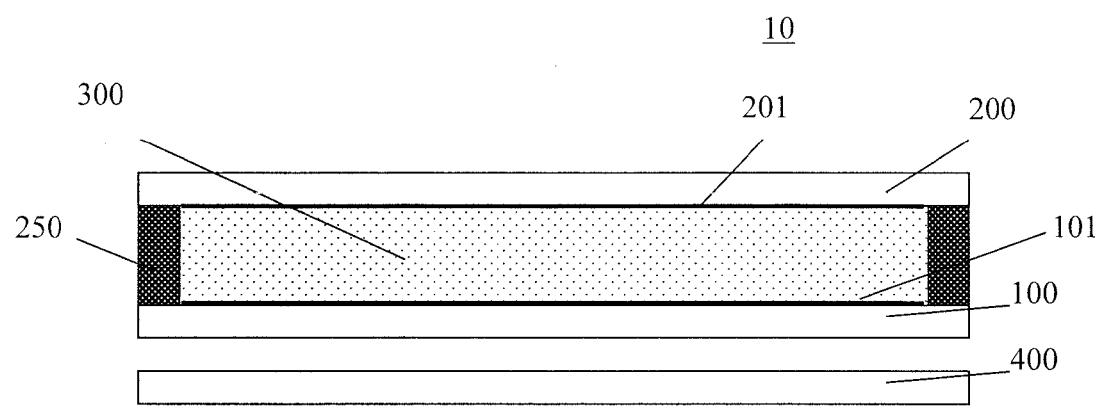
FIG. 8 shows a cross-sectional view of a liquid crystal display according to an embodiment of the present disclosure.

As shown in FIG. 8, the liquid crystal display 10 comprises an array substrate 100 and a color filter substrate 200. Alignment films 101 and 201 are respectively formed on inner surfaces of the array substrate 100 and the color filter substrate 200, and the alignment films 101 and 201 are rubbed along a certain direction to form fine structures, such as, trenches and the like. The array substrate 100 and the color filter substrate 200 are positioned to opposite to each other and then are bonded to each other by using sealant 250 to form a liquid crystal cell. A liquid crystal layer 300 is filled inside the liquid crystal cell, and thus, a liquid crystal panel is completed. A backlight 400 is disposed below (or behind) the liquid crystal panel so as to provide a light source used for display of the liquid crystal panel. The array substrate 100 is an array substrate according to one of the above mentioned embodiments, such as, a substrate according to any of the embodiments as shown in FIGS. 3-6.

As shown in FIG. 3 or 5, the array substrate 100 comprises at least one data line 01, at least one gate line 02 and a plurality of pixel units defined by the data line 01 and the gate line 02. Each of the plurality of pixel units comprises a thin film transistor 31, a first electrode and a second electrode, the first electrode and the second electrode overlap each other in the pixel unit and are insulated from each other, and the second electrode is positioned above the first electrode. The direction of the second electrode forms a predetermined angle with respect to one side of the array substrate 100, and rubbing directions of alignment films on both the array substrate 100 and the color filter substrate are parallel to the side of the array substrate 100.

Figure 1:
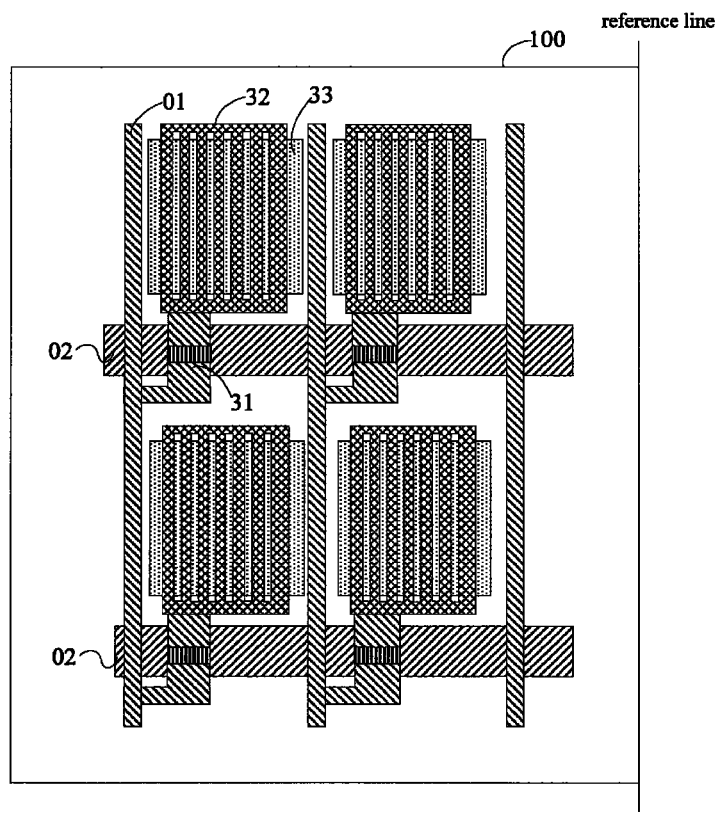
FIG. 1 is a top view for showing an array substrate of a conventional single-domain AD-SDS-LCD.
Figure 2:
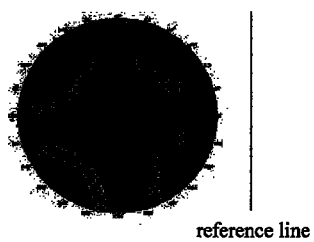
FIG. 2 is a view for showing a viewing angle effect of the AD-SDS-LCD comprising the array substrate in FIG. 1.

Generally, the rubbing directions of the alignment films on the color filter substrate and the array substrate bonded to each other are identical. In the conventional technology as shown in FIG. 1, the rubbing directions of the alignment films on the color filter substrate and the array substrate bonded to each other are identical with each other and form a certain angle with one side of the array substrate, and thus, in order to ensure the rubbing directions of the alignment films on the two substrates bonded to each other identical, the direction along which the alignment film on the color filter substrate is rubbed is symmetrical to one side of the array substrate with the direction along which the alignment film on the array substrate is rubbed during a manufacturing process; thereby, the production capacity of the production line is decreased. In contrast, in an embodiment of the present disclosure, the rubbing directions of the alignment films on the color filter substrate and the array substrate are both parallel to one side of the array substrate, and thus, during a manufacturing process, the alignment films on both the color filter substrate and the array substrate can be rubbed along the same direction being parallel to the one side of the array substrate in a simple way, and thereby, the production capacity of the production line can be improved.

Herein, with respect to the array substrate 100 shown in FIG. 3, the second electrode is connected to the drain electrode of the thin film transistor 31, that is, the second electrode in FIG. 3 is the pixel electrode 32 and accordingly the first electrode is the common electrode 33; and with respect to the array substrate 100 shown in FIG. 5, the first electrode is connected to the drain of the thin film transistor 31, that is, the first electrode in FIG. 5 is the pixel electrode 32 and accordingly the second electrode is the common electrode 33.

For example, the predetermined angle may be in a range of 5~20 degree. More preferably, the predetermined angle is 7 degree.

Alternatively, in another embodiment of the present disclosure, one segment of the data line 01 corresponding to each of the plurality of pixel units may be parallel to the direction of the second electrode in the pixel unit. For example, with reference to FIG. 4, one segment of the data line corresponding to each of the plurality of pixel units is parallel to the direction of the pixel electrode 32 in the pixel unit; or with reference to FIG. 6, one segment of the data line corresponding to each of the plurality of pixel units is parallel to the direction of the common electrode 33 in the pixel unit.

With a liquid crystal display provided by an embodiment of the present disclosure, the direction of a second electrode of a pixel unit forms a predetermined angle with one side of an array substrate and rubbing directions of alignment films on both the array substrate and the color filter substrate are parallel to the side of the array substrate, that is, the rubbing directions of the alignment films form a predetermined angle with the direction of the second electrode, and thus, a driving disorder can be avoided and the liquid crystal display can display images normally; meanwhile, the rubbing direction of the alignment film is parallel to the one side of the array substrate, that is, the original orientation of a liquid crystal is parallel to the side of the array substrate, so that the preferable viewing angle region (the cross region in FIG. 7) of the liquid crystal display is not deflected or shifted, and thereby, an excellent displaying can be achieved.

The embodiments of the disclosure being thus described, it will be obvious that the same may be varied in many ways. Such variations are not to be regarded as a departure from the spirit and scope of the disclosure, and all such modifications as would be obvious to those skilled in the art are intended to be included within the scope of the following claims.

What is claimed is:

1. An array substrate, comprising:
   at least a data line and at least a gate line; and
   a plurality of pixel units defined by the data line and the gate line, wherein each of the plurality of pixel units comprises a thin film transistor, a first electrode and a second electrode, the first electrode and the second electrode overlap each other and are insulated from each other, and the second electrode is positioned above the first electrode, and
   wherein an alignment film is formed on a surface of the array substrate, and a rubbing direction of the alignment film is parallel to a side of the array substrate on a side of the data line, wherein the second electrode is rectangular and comprises a plurality of stripe slits in parallel with each other and the stripe slits form a predetermined angle which is larger than 15 degrees and which is equal to or smaller than 20 degrees respective to the side of the array substrate on the side of the data line; wherein an end portion of each stripe slit has an arc shape.

2. The array substrate according to the claim 1, wherein the second electrode is connected to a drain electrode of the thin film transistor.

3. The array substrate according to the claim 1, wherein the first electrode is connected to a drain electrode of the thin film transistor.

4. The array substrate according to the claim 1, wherein the first electrode has a pattern.

5. A liquid crystal display, comprising:
   an array substrate; and
   a color filter substrate;
   wherein the array substrate and the color filter substrate are positioned opposite to each other to form a liquid crystal cell, alignment films are respectively formed on inner surfaces of the array substrate and the color filter substrate, and the array substrate comprises:
   at least a data line and at least a gate line; and
   a plurality of pixel units defined by the data line and the gate line, wherein each of the plurality of pixel units comprises a thin film transistor, a first electrode and a second electrode, and the first electrode and the second electrode overlap each other and are insulated from each other, and the second electrode is positioned above the first electrode, and
   wherein an alignment film is formed on a surface of the array substrate, a rubbing direction of the alignment film is parallel to a side of the array substrate on a side of the data line; wherein a rubbing direction of the alignment film on the color filter substrate is identical to the rubbing direction of the alignment film on the array substrate, wherein the second electrode is rectangular and comprises a plurality of stripe slits in parallel with each other and the stripe slits form a predetermined angle which is larger than 15 degrees and which is equal to or smaller than 20 degrees respective to the side of the array substrate on the side of the data line; wherein an end portion of each stripe slit has an arc shape.

6. The liquid crystal display according to the claim 5, wherein the second electrode is connected to a drain electrode of the thin film transistor.

7. The liquid crystal display according to the claim 5, wherein the first electrode is connected to a drain electrode of the thin film transistor.

8. The liquid crystal display according to the claim 5, wherein the first electrode has a pattern.

9. The array substrate according to the claim 1, wherein one segment of the data line corresponds to each of the plurality of pixel units is parallel to the direction of the second electrode in the pixel unit and the data line is formed in a continuous zigzag shape.

10. The array substrate according to the claim 2, wherein one segment of the data line corresponds to each of the plurality of pixel units is parallel to the direction of the second electrode in the pixel unit and the data line is formed in a continuous zigzag shape.

11. The array substrate according to the claim 3, wherein one segment of the data line corresponds to each of the plurality of pixel units is parallel to the direction of the second electrode in the pixel unit and the data line is formed in a continuous zigzag shape.

12. The liquid crystal display according to the claim 5, wherein one segment of the data line corresponds to each of the plurality of pixel units is parallel to the direction of the second electrode in the pixel unit and the data line is formed in a continuous zigzag shape.

13. The liquid crystal display according to the claim 6, wherein one segment of the data line corresponds to each of the plurality of pixel units is parallel to the direction of the second electrode in the pixel unit and the data line is formed in a continuous zigzag shape.

14. The liquid crystal display according to the claim 7, wherein one segment of the data line corresponds to each of the plurality of pixel units is parallel to the direction of the second electrode in the pixel unit and the data line is formed in a continuous zigzag shape.

* * * * *